July 9, 1963            D. GIACOSA            3,096,843
REAR-ENGINED MOTOR VEHICLES HAVING AIR-COOLED ENGINES
Filed Jan. 13, 1961
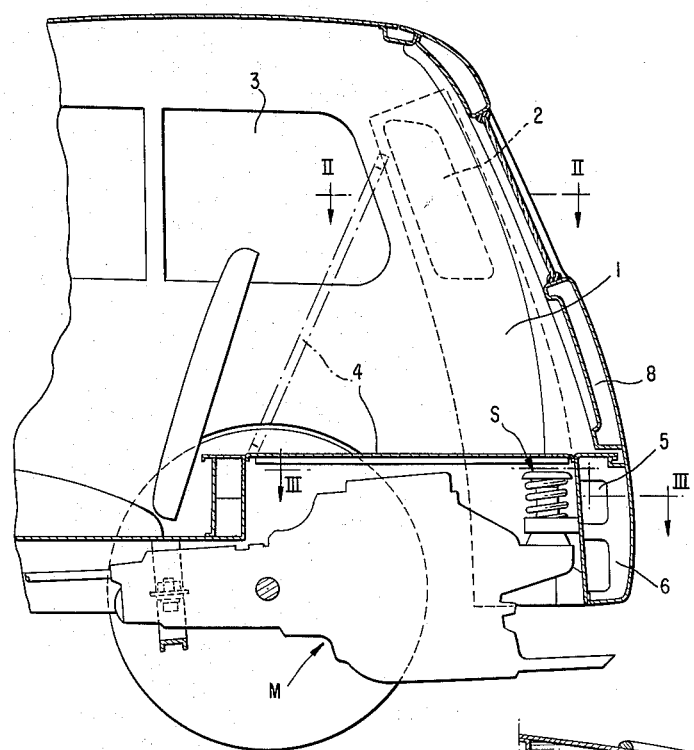
FIG.1
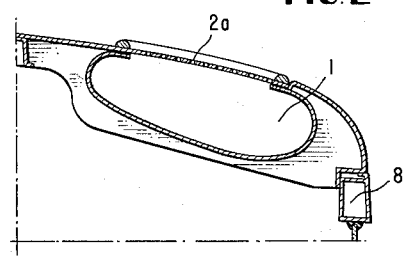
FIG.2
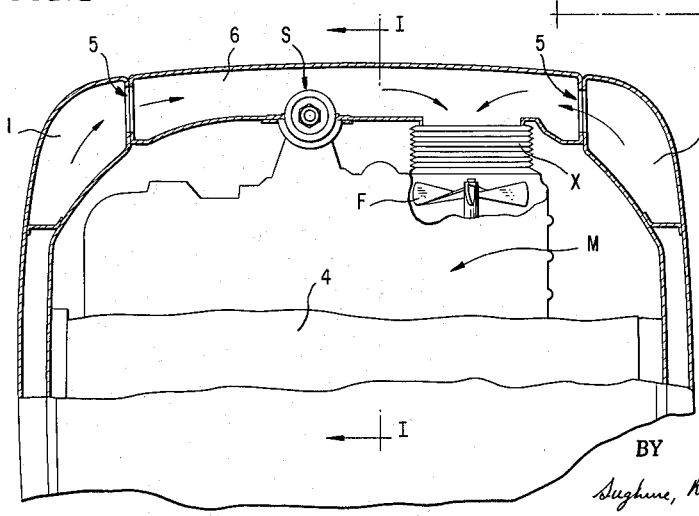
INVENTOR.
DANTE GIACOSA
BY
ATTORNEYS

3,096,843
REAR-ENGINED MOTOR VEHICLES HAVING AIR-COOLED ENGINES
Dante Giacosa, Turin, Italy, assignor to Fiat Societa per Azioni, Turin, Italy
Filed Jan. 13, 1961, Ser. No. 82,598
Claims priority, application Italy Jan. 13, 1960
2 Claims. (Cl. 180—54)

This invention relates to an arrangement for conveying the cooling and combustion air for internal combustion engines, more particularly on motor vehicles and small delivery trucks equipped with an air-cooled rear engine.

An object of this invention is to provide an air conveying system by which air can be drawn at a region sufficiently remote from the vehicle wheels to reduce the quantity of dust in the drawn-in air.

A further object of this invention is to provide an air conveying system such that a rear door can be fitted on vehicles of the type referred to above, notwithstanding the rear-engined arrangement, and a load carrying platform or floor can be arranged above the engine flush with the lower edge of the door.

The system according to this invention essentially comprises two air conveying upstanding ducts opening into air intakes situated at a top region of the rear portion of the vehicle body in order to draw in air which is substantially free from dust and the like, said conveying ducts connecting at their lower ends with a manifold from which air is drawn by means of a suction fan for cooling and, if desired, for feeding the vehicle engine.

The manifold is conveniently arranged with its axis extending horizontally and is formed by the cross beam interconnecting the side walls of the vehicle body at their lower rear end portions and assisting in carrying the engine.

Further characteristic features and advantages will be understood from the appended detailed description with reference to the accompanying drawings given by way of a non-limiting example, wherein:

FIGURE 1 is a sectional view of line I—I of FIG. 3 showing a rear portion of a "station wagon" vehicle equipped with the air conveying system according to this invention.

FIGURE 2 is a cross sectional view on line II—II of FIG. 1 of a rear pillar of the vehicle body; and FIGURE 3 is a horizontal sectional view on line III—III of FIG. 1 of the above mentioned rear portion.

In the embodiment hereafter described relating to a vehicle of the "station wagon" type the air conveying system essentially comprises two vertically extending ducts 1, symmetrically arranged with respect to the longitudinal mid-plane of the vehicle (FIG. 3), the ducts being formed by the two rear vehicle pillars, rigidly connected to the end portions of the cross-beam.

The ducts 1 are terminated at the top in apertures 2 cut at the level of rear windows 3 behind the latter. The apertures 2 are provided with protecting grids 2a which serve at the same time for ornamental purposes.

The lower ends of ducts 1 extend beneath the loading platform 4 of the vehicle and open through lateral apertures 5 into a horizontally extending manifold 6 formed by a box sectioned cross-beam interconnecting the side walls of the vehicle body below the floor level and assisting in carrying the power unit M, whose rear part is attached to the intermediate portion of said cross-beam by means of a known type of spring support S. The cross-beam forms the rear wall of the vehicle body.

The manifold 6 is provided on its front side with a fitting having connected thereto a conduit 7 communicating with a cooling air suction fan F. Air for feeding the engine can be additionally drawn from the manifold 6 through suitable conduits not shown on the drawing.

With the lateral arrangement of the conveying ducts 1 a rear door as shown at 8 can be easily installed without altering in the least the vehicle structure.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What I claim is:
1. In a rear engine vehicle having a body comprising spaced side walls and a rear loading platform between said walls, a box-section load supporting cross-beam having an opening situated intermediately its ends, said cross-beam extending between the bottom rear portion of said side walls and beneath said loading platform and thereby forming a rear wall of said body, an engine provided with an air suction fan arranged beneath said loading platform and having its rear part supported by said cross-beam, an air duct beneath said platform connecting the opening in the cross-beam with the air suction fan, two lateral tubular pillars extending to the top rear portion of respective side walls and having their lower ends rigidly connected to either end of said cross-beam and having their interiors communicating with the interior of said cross-beam, and an air intake in the upper portion of each lateral pillar.

2. A rear engine vehicle as claimed in claim 1 further comprising rear doors attached to the body and positioned between said lateral pillars and above said cross-beam.

References Cited in the file of this patent
UNITED STATES PATENTS

| | | |
|---|---|---|
| 2,033,731 | Nallinger | Mar. 10, 1936 |
| 2,050,451 | Nallinger | Aug. 11, 1936 |
| 2,266,769 | Kramer | Dec. 23, 1941 |
| 2,299,157 | Lowther | Oct. 20, 1942 |
| 2,418,294 | Flogaus et al. | Apr. 1, 1947 |
| 3,011,577 | Komenda | Dec. 5, 1961 |

FOREIGN PATENTS

| | | |
|---|---|---|
| 220,075 | Switzerland | June 16, 1942 |

OTHER REFERENCES
German application Ser. No. N10,242, printed Aug. 30, 1956.